United States Patent [19]

Takayam et al.

[11] Patent Number: 4,991,031
[45] Date of Patent: Feb. 5, 1991

[54] ROTATING HEAD TYPE REPRODUCING APPARATUS

[75] Inventors: Nobutoshi Takayam, Kanagawa; Hiroo Edakubo; Susumu Kozuki, both of Tokyo; Masahiro Takei; Kenichi Nagasawa, both of Kanagawa, all of Japan

[73] Assignee: Canon Kabushika Kaisha, Tokyo, Japan

[21] Appl. No.: 145,656

[22] Filed: Jan. 13, 1988

Related U.S. Application Data

[63] Continuation of Ser. No. 699,852, Feb. 8, 1985, abandoned.

[30] Foreign Application Priority Data

| Feb. 10, 1984 | [JP] | Japan | 59-23998 |
| Mar. 15, 1984 | [JP] | Japan | 59-50711 |
| Mar. 17, 1984 | [JP] | Japan | 59-51754 |
| Mar. 17, 1984 | [JP] | Japan | 59-51755 |
| Mar. 21, 1984 | [JP] | Japan | 59-53951 |
| Mar. 22, 1984 | [JP] | Japan | 59-55329 |

[51] Int. Cl.$^5$ ............................................. H04N 5/78
[52] U.S. Cl. ................................ 360/10.2; 360/77.14
[58] Field of Search ................ 360/10.2, 10.3, 77, 360/DIG. 1, 77.12–77.15; 50/699, 852

[56] References Cited

U.S. PATENT DOCUMENTS

| 4,370,685 | 1/1983 | Hosoi et al. | 360/10.2 X |
| 4,393,416 | 7/1983 | Takeuchi et al. | 360/10.2 |
| 4,393,417 | 7/1983 | Kobayashi et al. | 360/10.3 |
| 4,549,234 | 10/1985 | Sakamoto | 360/77 X |
| 4,573,089 | 2/1986 | Maeda et al. | 360/77 |
| 4,630,146 | 12/1986 | Takayama et al. | 360/10.2 X |

FOREIGN PATENT DOCUMENTS 56-149876 11/1981 Japan.

*Primary Examiner*—Aristotelis M. Psitos
*Attorney, Agent, or Firm*—Toren, McGeady & Associates

[57] ABSTRACT

A rotating head type reproducing apparatus arranged to reproduce a recorded signal by tracing, one after another, with rotating heads many recording tracks formed on a record bearing medium at a given track pitch comprises: Moving apparatus for moving the record bearing medium in a direction crossing the recording tracks; shifting apparatus for shifting the positions of the rotating heads in a direction crossing their rotation plane; means apparatus for generating a pulse signal related to the record bearing medium moving operation of the moving apparatus; apparatus for generating timing signals related to the rotation of the rotating heads; first count apparatus for counting the pulse signal, the count value of the first count apparatus being arranged to return to an initial data every time a predetermined number n of the pulse signal is counted; second count apparatus arranged to read a data corresponding to the count value of the first count apparatus at a timing related to the timing signal and to count the pulse signal; and control apparatus which forms a control signal for controlling the shifting apparatus by using the count data of the second count apparatus.

17 Claims, 12 Drawing Sheets

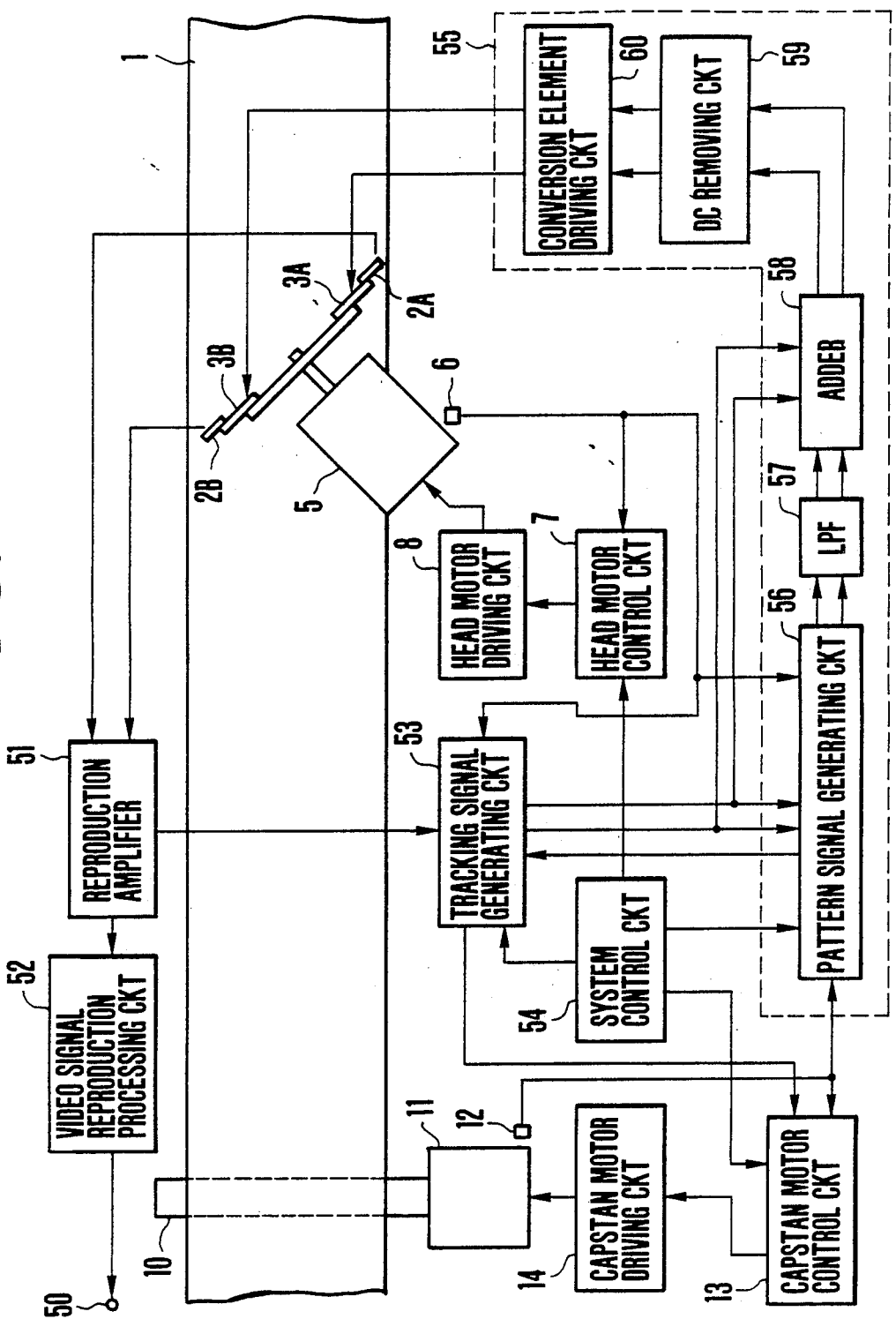

ROTATING HEAD TYPE REPRODUCING APPARATUS

This is a continuation of application Ser. No. 699,852, filed Feb. 8, 1985, abandoned.

BACKGROUND OF THE INVENTION

1. Field of the Invention

This invention relates to a rotating head type reproducing apparatus and more particularly to an apparatus arranged to reproduce a recorded signal by tracing, one after another, with rotating heads many recording tracks formed on a record bearing medium at a given track pitch.

2. Description of the Prior Art

The known rotating head type video signal reproducing apparatus include magnetic recording and/or reproducing apparatus of the kind arranged to record a video signal forming oblique recording tracks on a magnetic tape and to reproduce the recorded signal with two rotating heads (hereinafter will be called VTR for short). In this specification, the invention will be described, by way of example, as applied to a VTR.

A high density recording tendency of VTR's of recent years calls for tracing the recording tracks with fidelity. To meet this requirement many varied tracking methods have been contrived for accurately correcting the deviation of a reproducing head from the recording tracks (hereinafter referred to as a tracking error). In one of the prior art tracking methods, four pilot signals of different frequencies are superimposed on one-field portions of a video signal one after another during recording. Then, during reproduction, the pilot signals are reproduced from a reproducing track which is mainly traced by a head (hereinafter referred to as the main track) and also from adjacent tracks located on both sides of the main track. Tracking is thus carried out utilizing the pilot signals thus reproduced. In accordance with this method, the tracking error is detected by comparing the levels of the pilot signal components reproduced from the two adjacent tracks.

Meanwhile, the applications of VTR's have diversified. VTR's capable of performing special reproducing operations by allowing a magnetic tape to travel at a speed different from a speed employed for recording, such as still picture reproduction, slow motion reproduction, and high speed search reproduction are now increasing. For the special (or varied speed) reproduction of this kind, the reproducing head must be arranged to accurately trace each track without trespassing on other tracks in order to safely obtain a sharply reproduced picture. In one known method for meeting this requirement, a pattern signal generator is arranged to generate a pattern signal corresponding to a distance to a recording track to be reproduced (or reproducing track) on the tape from the scanning locus of a reproducing head obtained at a given tape travel speed. The reproducing head is shifted by some shifting means, such as a piezoelectric conversion element (for example, a bimorph element), in a direction perpendicularly crossing the rotation plane thereof and the shifting means is controlled according to the pattern signal. However, a tracking, error of course, arises even where a noiseless picture is obtained through varied speed reproduction carried out by this method. The conventional tracking method for correcting the tracking error is as follows: During recording, a control signal (hereinafter referred to as CTL signal), which is synchronized with the vertical synchronizing signal, of a video signal is recorded on and along one side of a magnetic tape. During reproduction, the CTL signal is reproduced to detect a relative tracking error and tape moving means such as a capstan, etc. and the above-stated shifting means are controlled based on the result of the error detection. This tracking method, however, takes an excessively long tracking time. Particularly, where the tape travels at a low speed as in the case of slow motion reproduction, a long time interval is required for reproduction of the CTL signal and thus an excessively long time becomes necessary for tracking. Besides, this tracking method is not applicable to still picture reproduction.

In view of this, to obtain tracking error signals without fail, it is conceivable to use the above-stated pilot signals for tracking in varied or special speed reproduction. However, in carrying out varied speed reproduction using the above-stated shifting means in a VTR of this kind, tracking control cannot be performed before the reproducing head actually begins to trace the track due to the absence of the CTL signal. Therefore, at the initial stage of a reproducing operation, the center line of a recording track and the center of the tracing locus of the reproducing rotary head deviate from each other in the travelling direction of the record bearing medium, although they are parallel with each other.

Generally, the capstan is controlled by means of the above-stated CTL signal immediately after commencement of tracing. However, a certain period of time is necessary for following it. It is, therefore, conceivable to add the above-stated CTL signal to the pattern signal in case of varied or special speed reproduction. However, the CTL signal is not obtainable until the reproducing rotary head begins to trace the recording tracks of the tape. Therefore, since the tracing locus of the reproducing head is always deviating in the given direction from the recording track as mentioned above, a tracking operation is necessary for each of the recording tracks to be traced. Then, the operation of the shifting means becomes unstable since the shifting means must be driven by the CTL signal immediately after the start of every tracing action. Beside, since no tracking has been done at the start of tracing, this degrades the quality of a picture thus reproduced.

The details of the conventional VTR of the kind performing the tracking operation with the CTL signal are as follows: Referring first to FIG. 1 of the accompanying drawings, a magnetic tape 1 is employed as a record bearing medium. Reproducing magnetic heads 2A and 2B have the same azimuth angle and are opposed to each other at 180 degrees. These heads 2A, 2B are mounted on the free ends of piezoelectric conversion elements 3A and 3B, such as bimorph elements. The tail ends of the conversion elements 3A and 3B are attached to a rotating member 4. The rotating member 4 is arranged to be rotated by a head rotating motor 5 in the direction of an arrow shown in the drawing. Although it is not shown in the drawing, the heads 2A and 2B are arranged to be rotated while protruding from a slit provided between a pair of tape guide drums in a known manner. Furthermore, the tape 1 is obliquely lapped more than 180 degrees around this pair of drums. A rotation phase detector 6 is arranged to detect the rotation phase of the heads 2A and 2B and to produce a signal which is used as a head switching signal (hereinafter referred to as an HSW signal) and is also supplied to a head motor control circuit 7. The head motor control circuit 7 is arranged to control the head rotating motor 5 via a head motor driving circuit 8 on the basis of the output of the detector 6 in such a way as to rotate the heads 2A and 2B at a predetermined rotation phase and at a predetermined rotational frequency. A control signal reproducing head 9 (hereinafter referred to as the CTL head) is arranged to reproduce a control signal (CTL signal) which is recorded on the lower part of the tape 1 at intervals, each corresponding to one frame portion of the signal to be reproduced, in the longitudinal direction of the tape 1. A capstan 10 is arranged to form a tape moving means for moving the tape 1 in the longitudinal direction thereof in conjunction with a pinch roller which is not shown. A capstan motor 11 is arranged to rotate the capstan 10. A frequency signal generator 12 is arranged to generate a frequency signal (hereinafter referred to as the capstan FG signal) which is representative of the rotation of the capstan 10. A capstan motor control circuit 13 is arranged to control, via a capstan motor driving circuit 14, the capstan motor 11 on the basis of the CTL signal from the CTL head 9 and a capstan FG signal from the frequency signal generator 12 in such a way as to rotate the capstan 10 at a predetermined phase and at a predetermined rotational frequency. A pattern signal generating circuit 15 is arranged to generate a pattern signal on the basis of the HSW signal from the rotation phase detector 6, the CTL signal from the CTL head 9 and the capstan FG signal from the frequency signal generator 12. The pattern signal is applied to the piezoelectric conversion elements 3A and 3B, causing the heads 2A and 2B to trace one and the same recording track on the tape 1 in each scanning field where reproduction is performed at each of arbitrary varied speeds including still picture reproduction and reverse rotation reproduction among others. A conversion element driving circuit 16 is arranged to drive the conversion elements 3A and 3B based on the pattern signal from the pattern signal generating circuit 15.

FIG. 2 shows, by way of example, the details of the above-stated pattern signal generating circuit 15. The circuit 15 is provided with input terminals 17, 18 and 19 which are arranged to receive the capstan FG signal from the frequency signal generator 12, the CTL signal from the CTL head 9 and the HSW signal from the rotation phase detector 6. A binary counter 20 is arranged to count the capstan FG signal which is supplied to the terminal 17 and to be reset by the CTL signal which is supplied to the terminal 18. A timing signal generating circuit 21 is arranged to generate a timing signal on the basis of and in synchronization with the HSW signal supplied to the terminal 19. A presettable binary counter 22 is arranged to be preset by the timing signal from the timing signal generating circuit 21 with the output of the counter 20 used as a presetting data PD and to count the capstan FG signal supplied to the terminal 17. A digital-to-analog (D/A) converter 23 is arranged to D/A convert the output of the presettable counter 22. A still pattern generator 24 is arranged to generate a still picture reproducing fixed pattern signal on the basis of the timing signal coming from the timing signal generating circuit 21. An adder 25 is arranged to add together, the output of the D/A converter 23 and that of the still pattern generator 24. An output terminal 26 is arranged to produce a conversion element controlling pattern signal which is the output of the adder 25.

The special reproducing operation of the VTR, which is arranged as mentioned above, and particularly the operation of the pattern signal generating circuit 15 of FIG. 2 is described with reference to FIGS. 3 and 4 in the following: In FIG. 3, parts (d)-(g) show the CTL signal, the output of the counter 20 of FIG. 2, the output of the presettable counter 22 or the D/A converter 23 of FIG. 2 and the output of the adder 25 of FIG. 2 respectively obtained at the time of reproduction performed at a speed increased 1.5 times. FIGS. 4(A) and 4(B) show the scanning center loci of the heads 2A and 2B relative to the center loci of recording tracks on the tape 1 obtained respectively during and still picture reproduction and the 1.5 times increased speed reproduction.

With the heads 2A and 2B rotated by the head motor 5, the rotation phase detector 6 produces the HSW signal as shown at a part (a) of FIG. 3. Then, the timing signal generating circuit 21 of the pattern signal generating circuit 15 shown in FIG. 2 produces a timing signal which is synchronized with the rise and fall of the HSW signal, as shown at a part (b) of FIG. 3. In accordance with this timing signal, the still pattern generator 24 produces a still pattern signal for causing the heads 2A and 2B to be continuously shifted from 0 to 1 track pitch (hereinafter referred to as TP) within a scanning range for one field.

In carrying out a so-called field still reproducing operation in which one field signal recorded in one recording track with a recording head having the same azimuth angle as the reproducing heads 2A and 2B is reproduced alternately by means of the two heads 2A and 2B, the relation of the scanning center loci of the heads 2A and 2B to the recording track on the tape 1 becomes as shown in FIG. 4(A). Referring to FIG. 4(A), full lines represent the center loci of the recording tracks of the field signal recorded by the recording head having the same azimuth angle as the reproducing heads 2A and 2B. Broken lines represent the center loci of recording tracks of a field signal recorded by a recording head having an azimuth angle which differs from that of the heads 2A and 2B. An outline arrow represents the scanning center loci of the heads 2A and 2B. A symbol CTL denotes the recording loci of the CTL signal. FIG. 4(B) is also drawn in the same manner. As shown in FIG. 4(A), the scanning center loci "c" of a heads 2A and 2B (hereinafter referred to as the head locus "c") become a line segment diagonally connecting the beginning end of a center locus "a" of the track to be reproduced (hereinafter referred to as the track locus "a") to the terminating end of an adjacent track locus "b" on the left side of the track locus "a". To correct this deviation and to adjust the head locus "c" to the track locus "a", the heads 2A and 2B are continuously shifted from 0 to 1 TP within one field scanning range in a direction reverse to the direction in which the tape 1 travels during recording. In other words, assuming that the tape 1 travels in the direction of "+" during recording, the heads 2A and 2B are shifted in the direction of "−".

It will be understood from the above description that the still pattern signal, which is produced from the still pattern generator 24 as shown at the part (c) in FIG. 3, is capable of satisfying the requirement in shifting the heads 2A and 2B for field still reproduction.

Meanwhile, the capstan FG signal produced from the frequency signal generator 12 with the capstan 10 rotated by the capstan motor 11 is supplied to the counters 20 and 22, which are included in the pattern signal generating circuit 15 of FIG. 2. These counters 20 and 22 count the capstan FG signal. However, since the counter 20 is reset by the CTL signal of the CTL head 9 for every one-frame portion, the upper limit of the counted value of the counter 20 is set at a value corresponding to +2 track pitches. In the event of the 1.5 times increased speed reproduction, since the CTL signal becomes as shown at a part (d) of FIG. 3, the output of the counter 20 becomes as shown at a part (e) of FIG. 3. The presettable counter 22 counts the capstan FG signal while being preset by the timing signal from the timing signal generating circuit 21 (a part (b) of FIG. 3) at the output value of the counter 20 obtained at that time. Therefore, the count output of the counter 22 or the output of the D/A converter 23 becomes as shown at a part (f) of FIG. 3 during the 1.5 times increased speed reproduction. Accordingly, the adder 25 adds up the output of the D/A converter 23 obtained at that time and the output of the still pattern generator 24 and produces a pattern signal as shown at a part (g) of FIG. 3 during the 1.5 times increased speed reproduction.

Since the counters 20 and 22 are arranged to count the capstan FG signal, the outputs of these counters 20, 22 and the adder 25 include small stepwise variations therein. However, such variations are omitted in the drawing for simplified illustration.

In the event of 1.5 times increased speed reproduction, the head locus in relation to the track locus on the tape 1 becomes as shown in FIG. 4(B). Referring to FIG. 4(B), reference symbols A1, A2, A3,—denote head loci of the head 2A; B1, B2, B3,—denote head loci of the head 2B; and a1, a2, a3,—denote track loci of the field tracks recorded by a recording head having the same azimuth angle as the heads 2A and 2B. For the first field, the head 2A must be continuously shifted to an extent corresponding to a distance from 0 to +0.5 TP within the first field scanning range in order to adjust the head locus A1 to the track locus a1. For the second field, the head 2B must be continuously shifted to an extent corresponding to a distance from +1.5 TP to +2 TP within the second field scanning range in order to adjust the head locus B1 to the same track locus a1. In the third field, the head 2A must be continuously shifted to an extent corresponding to a distance from +1 TP to 1.5 TP within the third field scanning range in order to adjust the head locus A2 to the track locus a2. In the fourth field, the head 2B must be continuously shifted to an extent corresponding to a distance from +0.5 TP to +1 TP within the fourth field scanning range in order to adjust the head locus B2 to the track locus a3. After that, the above-stated adjustment steps are repeated in a cycle for every four field periods. The pattern signal which is shown at the part (g) in FIG. 3 is appropriate for shifting the heads 2A and 2B in the above-stated manner.

While the 1.5 times increased speed reproducing operation is described by way of example in the foregoing, the pattern signal generating circuit 15 is capable of giving other pattern signals required in controlling the heads 2A and 2B for other reproducing operations to be carried out at desired speeds other than the speed increased 1.5 times.

The pattern signal which is thus obtained from the pattern signal generating circuit 15 is supplied to the conversion element driving circuit 16. Then, the driving circuit 16 drives the piezoelectric conversion elements 3A and 3B to bring the heads 2A and 2B to an applicable reproducing track on the basis of the above-stated pattern signal and the HSW signal from the rotation phase detector 6.

In the conventional apparatus, as described above, the pattern signal is obtained to control the head in a manner suitable for reproduction at a speed selected as desired. However, in accordance with the arrangement of the conventional apparatus, the CTL signal is indispensable for forming the pattern signal and, therefore, the arrangement becomes totally incapable of functioning for a system not using the CTL signal. Furthermore, it is another shortcoming of the conventional apparatus that, in the absence of the CTL signal, the position of the head cannot be controlled in bringing the rotating head onto the magnetic tape 1.

Even if these problems are completely solved, conventional apparatus still have the following problem: Assuming that the travelling speed of the tape 1 for recording is "v" and the tape 1 travel speed for reproduction is Nv (N representing a speed in the positive direction if it is of a positive value and in the negative direction if it is of a negative value), the extent to which a reproducing head 2A, 2B must be shifted during one field period is proportional to a value $(N-1)$ times the TP. This means that, in view of this, the gradient of a fixed pattern signal is arranged to be proportional to $(1-N)$.

Therefore, as will be further described later with reference to the accompanying drawings, in the conventional method for generating the pattern signal, a signal is first formed with a gradient based on the travelling speed of the tape 1 and then a signal representing the difference between them is obtained by forming a symbol representing a gradient of $1/N$. However, this method necessitates two wave form forming circuits for forming two wave forms of different gradients and accordingly an arrangement to adjust the timings of the two wave forms. This arrangement thus has often resulted in a complex circuit arrangement.

It is an object of this invention to provide a rotating head type reproducing apparatus which is capable of solving the above-stated problems of the conventional apparatus and which always satisfactorily performs a tracking operation at an arbitrary travelling speed of a record bearing medium.

It is another object of this invention to provide a rotating head type reproducing apparatus which is capable of forming a control signal for shifting the head thereof in the event of reproduction at an arbitrary travelling speed of a record bearing medium without recourse to any special control signal recorded in the travelling direction of the record bearing medium.

It is a further object of this invention to provide a rotating head type reproducing apparatus which is capable of accurately controlling the thrusting position of the rotating head thereof on a record bearing medium.

It is a still further object of this invention to provide a rotating head type reproducing apparatus which permits simplification of a control signal forming circuit arranged to form a control signal for a head shifting operation.

These and further objects and features of this invention will become apparent from the following detailed description of preferred embodiments thereof taken in conjunction with the accompanying drawings.

SUMMARY OF THE INVENTION

To attain these objects, a rotating head type reproducing apparatus which embodies an aspect of this invention and is arranged to reproduce a recorded signal by tracing, one after another, with rotating heads, many recording tracks formed on a record bearing medium at a given track pitch comprises: Moving means for moving the record bearing medium in a direction crossing the recording tracks; shifting means for shifting the positions of the rotating heads in a direction crossing their rotation plane; means for generating a pulse signal related to the record bearing medium moving operation of the moving means; means for generating a timing signal related to the rotation of the rotating heads; first count means for counting the pulse signal, the count value of the first count means being arranged to return to an initial data every time a predetermined number n of the pulse signal is counted; second count means arranged to read a data corresponding to the count value of the first count means at a timing related to the timing signal and to count the pulse signal; and control means which forms a control signal for controlling the shifting means by using the count data of the second count means.

BRIEF DESCRIPTION OF THE DRAWINGS

FIG. 5 is a block diagram showing the arrangement of the essential parts of a VTR arranged in an embodiment of this invention.

DETAILED DESCRIPTION OF THE PREFERRED EMBODIMENTS

Figure 1:
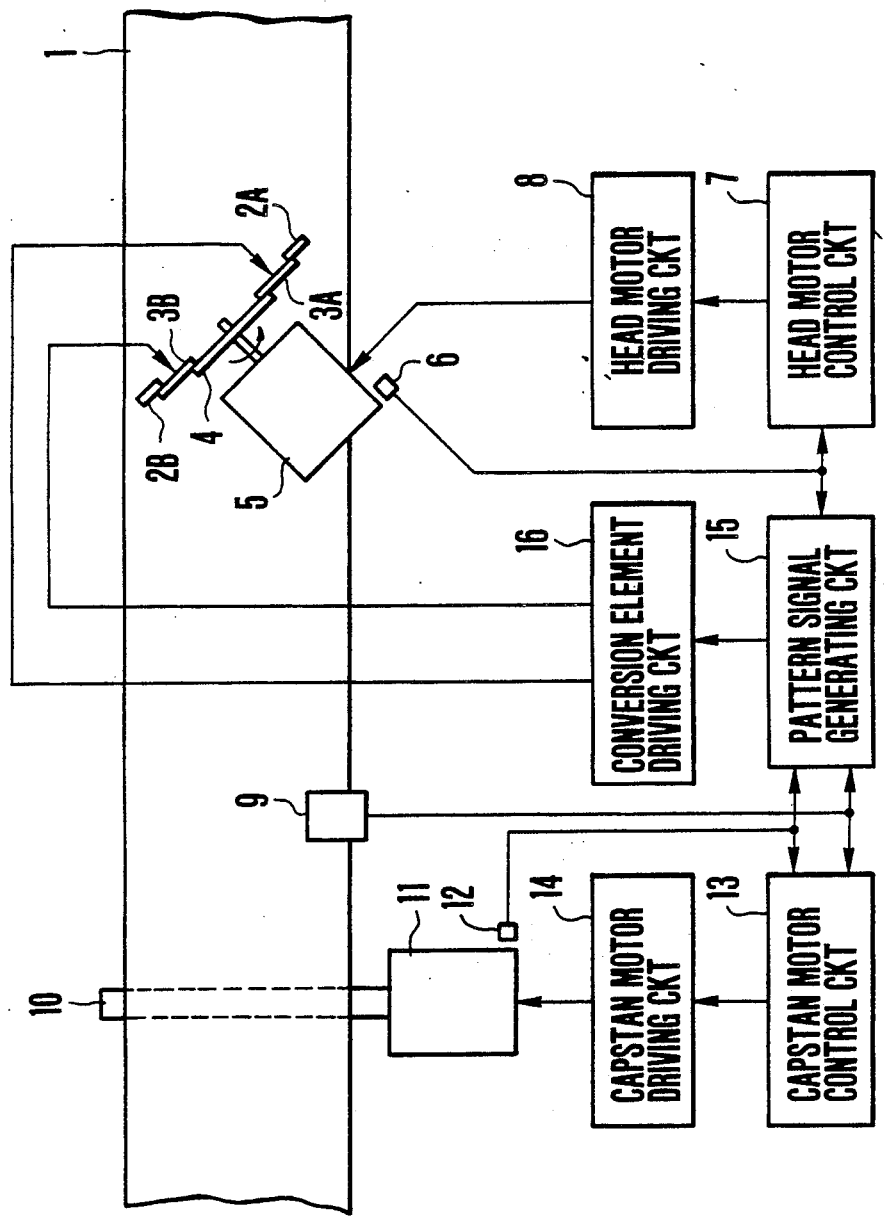
FIG. 1 is a block diagram showing, by way of example, the conventional rotating head type reproducing apparatus or a VTR and particularly showing the arrangement of parts thereof essentially related to this invention.
Figure 2:
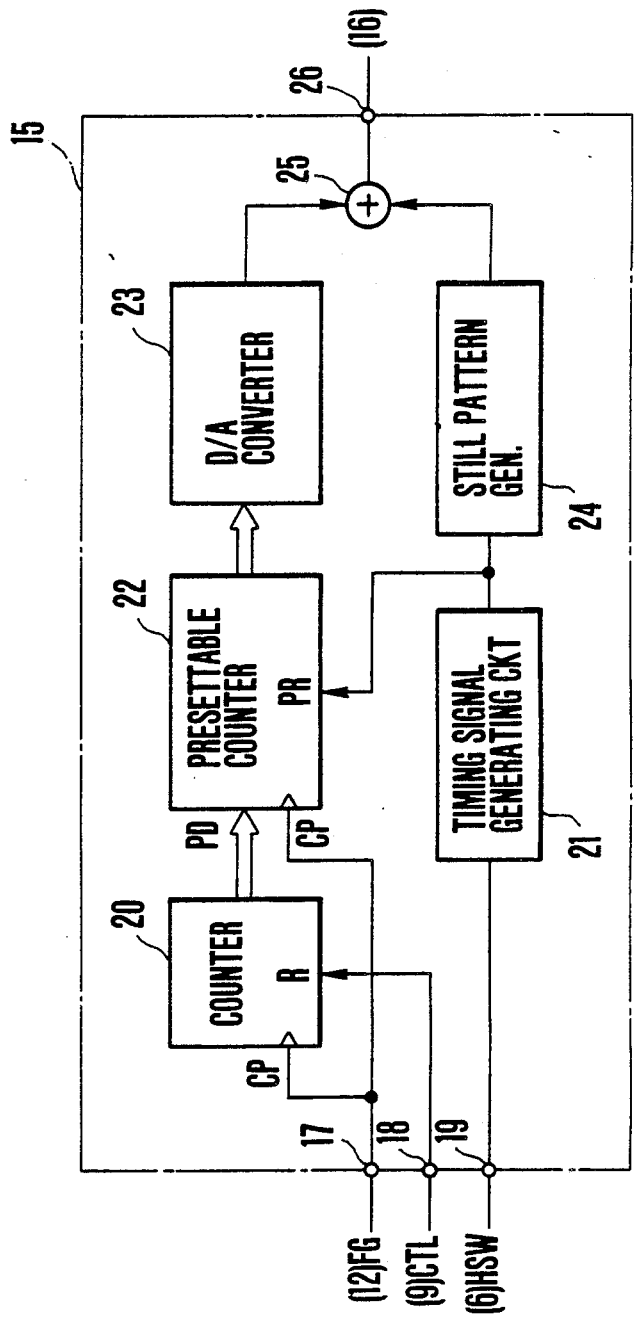
FIG. 2 is a block diagram showing a specific example of the details of a pattern signal generating circuit which is included in the VTR shown in FIG. 1.
Figure 3:
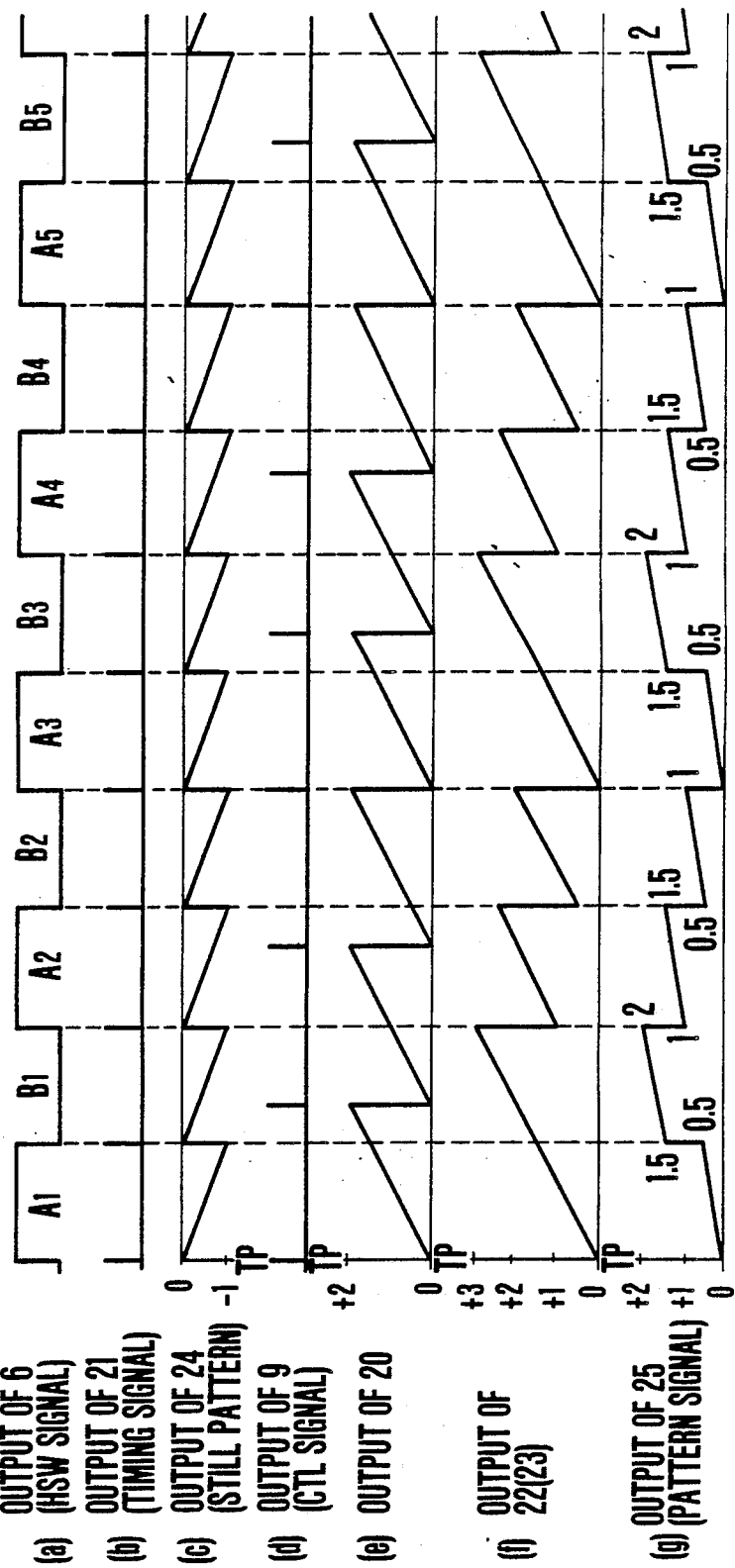
FIG. 3, consisting of (a)–(g), is a wave form chart showing the input and output wave forms of the various circuit elements of FIG. 2 as obtained during reproduction at a tape speed increased by 1.5 times.
Figure 4A:
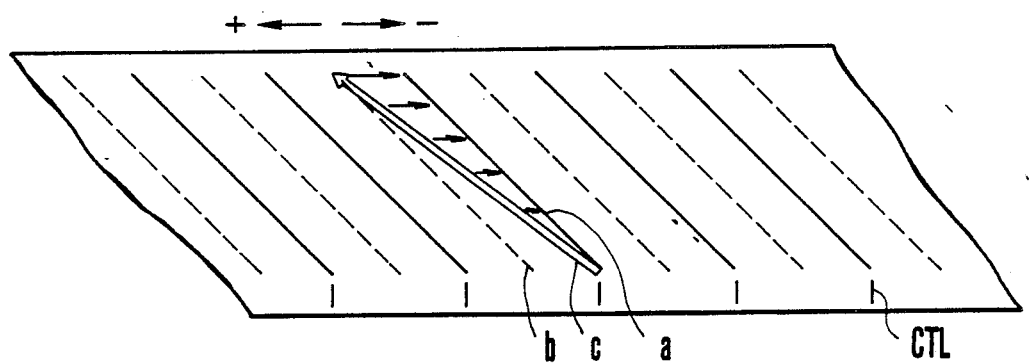
FIGS. 4(A) and 4(B) are illustrations of relations between the scanning center loci of the heads of the VTR and the loci of the centers of recording tracks on a tape obtained respectively during still picture reproduction and during reproduction performed at a tape travelling speed increased by 1.5 times.
Figure 4B:
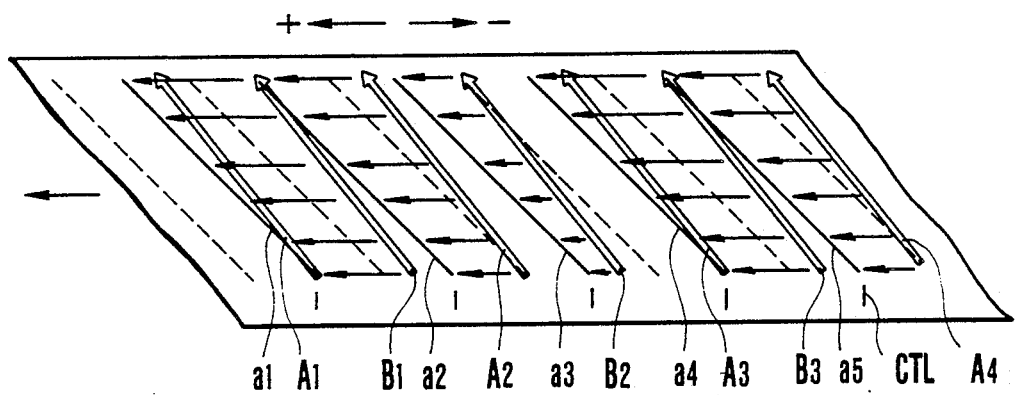

FIG. 5 is a block diagram mainly showing the outline of an arrangement of a special reproduction system employed in a VTR which is arranged in an embodiment of this invention. In FIG. 5, components similar to those shown in FIG. 1 are identified by the same reference numerals and their details are omitted from the following description. Since no CTL signal is used, the element 9 shown in FIG. 1 is omitted in this embodiment. With this exception, the elements 1-14 of FIG. 1 remain unchanged in this embodiment. In the case of this embodiment which is shown in FIG. 5, the conventional tracking method of using the CTL signal is replaced by the following method: Pilot signals of, for example, four different frequencies are superimposed on a video signal, one on each one-field portion of the video signal. In reproducing the video signal, pilot signal portions are separated. Information on deviation of the reproducing head 2A, 2B from recording tracks is obtained by comparing the levels of the pilot signals obtained from tracks which are adjacently on both sides of the main track being traced by the head 2A, 2B. The information thus obtained is used as a tracking control signal. In other words, the embodiment is arranged to perform tracking in a known method called a 4 f method. A brief description of the function of each part of FIG. 5 is as follows:

As mentioned above, a reproduced signal obtained from the reproducing heads 2A and 2B includes a video signal and the pilot signals which are to be used for tracking. The reproduced signal is amplified by a reproduction amplifier 51 and is formed into a continuous signal by means of the HSW signal. The continuous signal is supplied to a video signal reproduction processing circuit 52 and a tracking signal generating circuit 53. The video signal reproduction processing circuit 52 is arranged to separate the video signal from the output of the reproduction amplifier 51 and to process it through demodulation, etc. into its original signal, form. The reproduced video signal which is thus processed, is supplied to an output terminal 50. Meanwhile, at the tracking signal generating circuit 53, the pilot signal component is separated from the output of the reproduction amplifier 51. Then, the levels of pilot signals obtained from the two adjacent tracks are compared with each other and a tracking control signal is obtained through a known process.

A system control circuit 54 is arranged to control the operations of various components of the apparatus according to the operating mode of the apparatus, because: The head motor control circuit 7, the capstan motor control circuit 13, the tracking signal generating circuit 53, a pattern signal generating circuit which will be described later, etc. operate in different manners during reproduction than they do during recording and their operations also vary with the designated travelling speed of the tape 1. The system control circuit 54, therefore, produces a control signal which makes each of them operate in a manner suited for the operating mode of the apparatus. A conversion element control circuit 55 includes a pattern signal generating circuit 56, a low-pass filter (LPF for short) 57, a subtraction circuit 58, a DC component removing circuit 59 and a conversion element driving circuit 60. The above-stated piezoelectric conversion elements 3A and 3B are driven by the output of this conversion element control circuit 55 to cause the reproducing heads 2A and 2B to accurately trace one and the same recording track in each scanning field.

Figure 6:
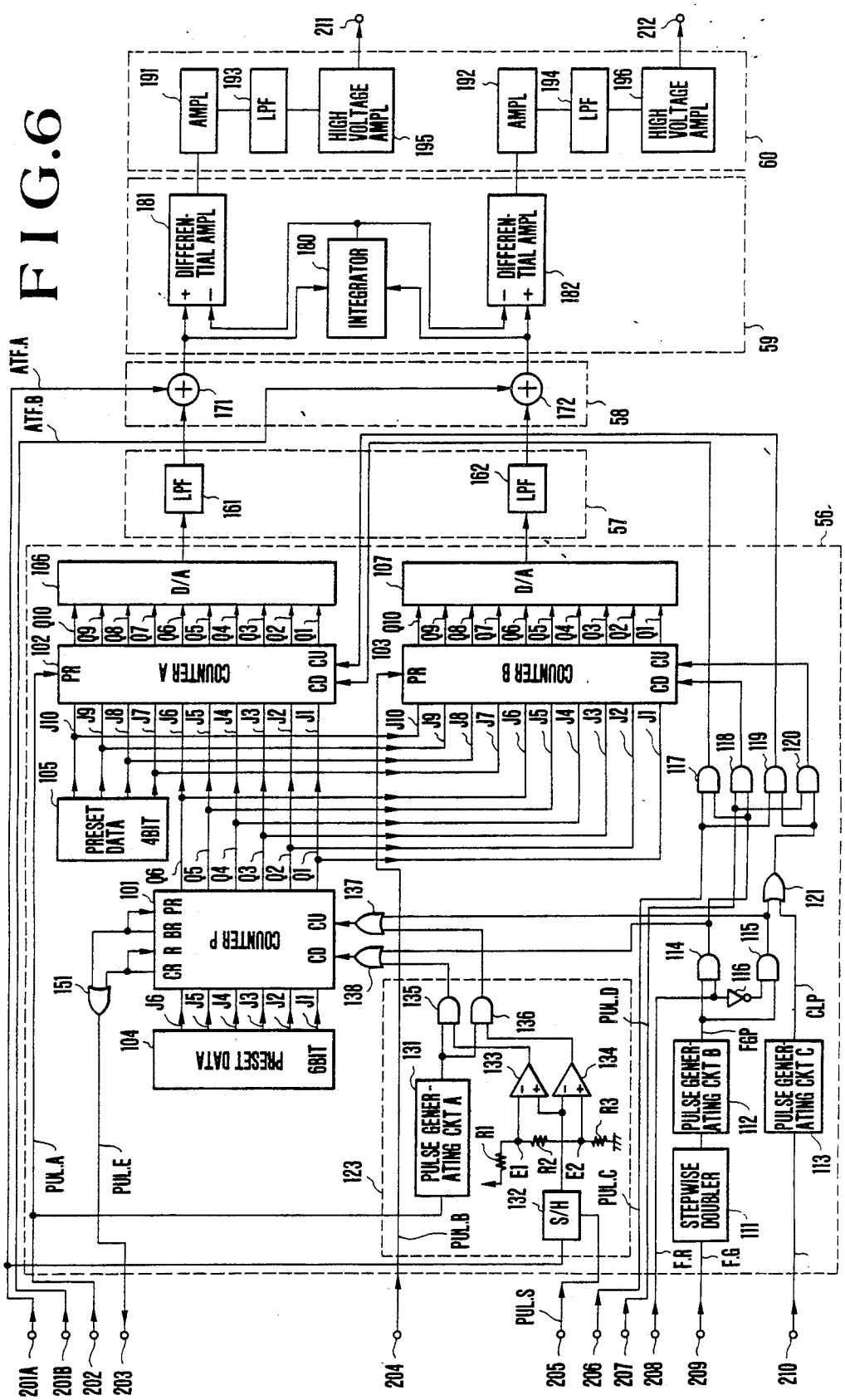
FIG. 6 is a circuit diagram showing, by way of example, the detailed arrangement of a conversion element control circuit shown in FIG. 5.

FIG. 6 shows the details of the above-stated conversion element control circuit 55. The circuit 55 drives these conversion elements 3A and 3B by generating the conversion element controlling pattern signal, as described below with reference to FIG. 6:

The pattern signal generating circuit 56 mainly includes a counter P 101, a counter A 102 and a counter B 103. Each of these counters P 101, A 102, B 103 has up- and down-count inputs in parallel and is provided with a down-count input terminal CD and an up-count input terminal CU. In this specific embodiment, these counters P 101, A 102 and B 103 are binary counters.

In order to obtain a fixed pattern signal which is necessary for the noiseless special reproducing operation mentioned in the foregoing, the signal must include at least phase information required for accurately adjusting the thrusting position of the reproducing head 2A, 2B to the reproducing track which varies with the travel of the tape 1 and speed information required for bringing the tracing locus of the reproducing head 2A, 2B corresponding to the travelling speed of the tape 1 into agreement with the gradient of the reproducing track. In the pattern signal generating circuit 56 shown in FIG. 6, the above-stated phase information is obtained by means of the counter P 101 and the speed information by means of the counter A 102 and the counter B 103.

In obtaining the phase information, the counter P 101 operates as follows: The counter P 101 carries up the count thereof when it counts up a number (2n) two times as many as a number n of the pulses of the capastan FG signal which are produced when the tape 1 moves to an extent of 2 TP's and the counter produces a carry signal from a terminal CR thereof. Then, the carry signal is supplied to a reset terminal R of the counter P 101 resetting the counter P101. The counter P 101 carries down the count thereof when it likewise counts down 2n times and then produces a borrow signal. This borrow signal is supplied to a preset terminal PR of the counter P 101 to preset the counter P 101 at a preset data which is generated by a preset data generator 104 and which corresponds to 2n. Assuming that the number (n) of pulses of the capstan FG signal generated when the tape 1 moves to the extent of 2 TP's is 24, for example, the counter P 101 repeatedly counts up from 0 to 48. In the event of down counting, the counter P 101 repeatedly counts down from 48 down to 0.

The pattern signal generating circuit 56 is provided with an input terminal 209 which is arranged to receive the capstan FG signal; a frequency stepwise doubler 111 which is arranged to generate pulses at the rise and fall of the capstan FG signal; a pulse generator B 112 which is arranged to narrow the width of the pulses produced from the frequency stepwise doubler 111; and a terminal 208 which is arranged to receive a high level signal from the system control circuit 54 when the tape 1 is travelling in the forward or positive direction (or in the same direction as the direction taken in recording) and a low level signal when the tape 1 is travelling in the negative direction (or the direction reverse to the recording direction). Hereinafter, these high and low level signals will be called the F/R signal. The F/R signal is arranged to be supplied to an AND gate 115 via an AND gate 114 and an inverter 116. Therefore, the output pulses of the pulse generator B 112 are supplied to the terminal CD of the counter P 101 via the AND gate 114 and an OR gate 138 when the tape 1 is travelling in the positive direction and is supplied to the terminal CU of the counter P 101 via the AND gate 115 and an OR gate 137 when the tape 1 is travelling in the negative direction.

With the pattern signal generating circuit 56 arranged in this manner, the output data of the counter P 101 always indicates relative positional discrepancy (relative phase information) between a track to be reproduced on the travelling tape 1 (which is formed by a recording head having the same azimuth angle as the heads 2A and 2B) and the thrusting position of the reproducing head 2A, 2B. Therefore, the thrusting position of each reproducing head 2A, 2B is controllable by virtue of this output data. However, since this phase information is nothing more than information on a relative phase, the information is usable only in cases where the just preceding thrusting position of the reproducing head 2A, 2B coincides with the reproducing track. Whereas, the conventional apparatus which is using the CTL signal and is arranged as shown in FIG. 1 has been capable of obtaining the thrusting position of the reproducing head 2A, 2B as absolute phase information based on the recorded position of the CTL signal. In the case of this embodiment, therefore, while the above-state relative phase information is generated by the counter P 101 beforehand, the thrusting position of the reproducing head 2A, 2B is arranged to be adjusted to the reproducing track. This function is performed by a thrusting position control circuit 123 shown in FIG. 6. This circuit 123 is arranged to generate absolute phase adjusting pulses and to control the reproducing head 2A, 2B by means of the adjusting pulses in a direction bringing the thrusting position of the reproducing head 2A, 2B into agreement with the reproducing track even when they are not coinciding with each other. This thrusting phase control circuit 123 will be described in further detail later, after the description of the whole pattern signal generating circuit 56 ends.

The pulse signal to be up counted or down counted by the counter P 101 is obtained by doubling the capstan FG signal in a stepwise manner. This arrangement is made for the purpose of increasing the accuracy of the above-stated phase information. In other words, this arrangement effectively prevents the phase information form becoming coarse due to a reduction in the pulse generating number of the capstan FG signal relative to TP as a result of a high density recording tendency.

Although it will become apparent from further description given later on, the pulse width is narrowed by the pulse generating circuit B 112, because: Each of the counters P 101, A 102, B 103 might sometimes up or down count a plurality of pulse signals and is arranged to be capable of performing operations equivalent to addition and subtraction therein. In other words, the pulse generating circuit B 112 is provided for the purpose of preventing, when a plurality of pulse signals are concurrently supplied, a counting operation on one of them. A pulse generating circuit A 131 and a pulse generating circuit C 113 are also provided for the same purpose and will be omitted from the following description:

As described in the foregoing, the counter P 101 down counts the pulses related to the capstan FG signal when the tape 1 is travelling in the normal direction and to up count them when the tape 1 is travelling in the reverse direction. Such being the arrangement, the counter P 101 is capable of producing the relative phase information on the thrusting position of the reproducing head 2A, 2B the instant the head 2A, 2B is thrust forward to the reproducing track regardless of the travelling direction of the tape 1. For example, in the case of slow motion reproduction which is performed by allowing the tape 1 to travel in the forward direction at a speed $\frac{1}{3}$ of the recording speed (hereinafter referred to as forward $\frac{1}{3}$ slow speed reproduction) and in the case of slow motion reproduction which is performed by allowing the tape 1 to travel in the reverse direction at a speed $\frac{1}{3}$ of the recording speed (hereinafter referred to as reverse $\frac{1}{3}$ slow speed reproduction), the counter P 101 operates as follows: The output of the counter P 101 repeats 48→0 for every field scanning period in the forward $\frac{1}{3}$ slow speed reproduction and repeats 0→48 for every 6 field scanning periods in the case of the reverse $\frac{1}{3}$ slow speed reproduction. Assuming that the shifting extent of the conversion element is zero, if the output of the counter P 101 is 16 when the head 2A, 2B is thrust forward, for example, the thrusting position of the reproducing head 2A, 2B relative to the reproducing track deviates to an extent corresponding to $\frac{2}{3}$ TP in the negative direction in either the forward $\frac{1}{3}$ slow speed reproduction or the reverse $\frac{1}{3}$ slow speed reproduction.

The number of bits required for the counter P 101, in the case of a binary counter, must be arranged to be a sufficient number for indicating in the binary system the value 2n (48 in this embodiment) and is 6 bits in this case.

The data which is thus obtained by the counter P 101 is read out at a predetermined timing as the rotating head rotates to obtain thereby information on the thrusting phase of the reproducing head 2A, 2B relative to the track to be reproduced.

Next, the counter A 102 and the counter B 103, which operate by using the above-stated information, operate as follows: These counters 102 and 103 are arranged to produce fixed pattern signals including the above-stated phase information and speed information. In addition to the phase information obtained from the counter P 101, the counters A 102 and B 103 generate the speed information which is to be used for correcting a difference in inclination which takes place between the track to be reproduced and the tracing locus of the reproducing head 2A, 2B when the tape 1 is allowed to travel at a speed differing from the recording speed while the reproducing heads 2A and 2B are scanning the tape 1. As for the number of bits required for the counter A 102 and the counter B 103, each is arranged to have 10 bits in this specific embodiment. However, the number of bits should be determined based on the shifting degree of the conversion element 3A, 3B, that is, based on a desired maximum tape speed at which high speed search reproduction is to be carried out.

Each of the counters A 102 and B 103 is loaded with the output data of the counter P 101 as a lower 6 bit data at a predetermined timing related to the rotation of the heads 2A and 2B. This loading timing is determined by a signal which is obtained based on the HSW signal. A load signal (PUL-A) of the counter A 102 is supplied from a terminal 302 and a load signal (PUL-B) of the counter B 103 from a terminal 204. The inputs PUL-A and PUL-B are applied respectively to the preset terminals PR of the counters A 102 and B 103. Where the heads 2A and 2B are rotating with their phases deviating 180 degrees from each other, the inputs PUL-A and PUL-B are, of course, supplied at phases differing 180 degrees from each other.

With the inputs PUL-A and PUL-B respectively supplied to the terminals PR, each of the counters A 102 and B 103 is loaded with an initial data of lower 6 bits. As mentioned in the foregoing, the output data of the counter P 101 is used as the initial data of lower 6 bits. Meanwhile, higher 4 bits of these counters P 101, A 102, B 103 are generated by a preset data generating circuit 105. In the case of this embodiment, the data to be supplied from the circuit 105 is 1000. This data is used for the purpose of having the output data of each of the counters A 102 and B 103 at a level close the 0 level when the output data is D/A converted as a so-called offset binary data. More specifically, in this case, the initial data to be loaded is from 1000000000 to 1000110000 and thus the initial data comes close to 0. This is preferable because not much DC component will be generated, which will be described later herein. With the output data of the preset data generating circuit 105 based on the concept of avoiding the generation of the DC component, it is preferable to have the output data changed in accordance with the travelling speed of the tape 1 designated. For example, in the event of allowing the tape 1 to travel in the forward direction at a speed increased by ten times, the preset data generating circuit 105 produces a data of 1011. If the tape 1 is allowed to travel in the reverse direction at a speed increased six times, the circuit 105 produces a data of 0101.

With the counter A 102 and the counter B 103 thus provided with the initial data, these counters A 102, B 103 count, in the same manner as the above-stated counter P 101, the pulses which are of a narrow pulse width and which have a frequency twice as high as the frequency of the capstan FG signal produced by the pulse generating circuit B 112. Furthermore, the counter A 102 and the counter B 103 count a clock pulse signal CL, which is supplied to them from a terminal 210 via a pulse generation circuit C 113, regardless of the tape 1 travel speed.

The clock pulses which are produced from the pulse generating circuit C 113 are constantly led to the terminals CU of these two counters A 102 and B 103. Meanwhile, pulses which are produced from the pulse generating circuit B 112 are arranged to be led to the terminals CD of these counters A and B when the tape 1 is travelling in the positive or forward direction and to the terminals CU of these counters A 102 and B 103 when the tape 1 is travelling in the negative or reverse direction. The reason for this arrangement resides in that, as is well known, even at the same tape 1 travelling speed, the difference in inclination or gradient between the tracing locus of the reproducing head 2A, 2B and the track to be reproduced varies based on the travelling direction of the tape 1. For example, assuming that the tape 1 travelling speed employed in recording is "v" and the tape 1 travelling speed employed in reproduction is Nv (N representing a speed in the positive direction when it is of a positive value and a speed in the negative direction when it is of a negative value), the extent to which the reproducing head 2A, 2B must be shifted during one field period is proportional to a value (n−1) times as much as the TP.

The frequency of the pulses produced from the pulse generating circuit B 112 is proportional to the absolute value of the tape 1 travelling speed. Therefore, an inclination proportional to the value N is obtained by counting the pulses produced from the pulse generating circuit B 112. The pulses are down counted when the tape 1 is travelling in the positive direction and are up counted when the tape 1 travels in the negative direction to obtain an inclination proportional to the value −N. Meanwhile, an inclination is necessary for shifting the reproducing head 2A, 2B an extent corresponding to 1 TP when one field period is proportional to 1. In view of this, an inclination of +1 can be obtained by counting a number of pulses corresponding to 1 TP (48 in this embodiment) within one field period. A desired inclination, which is in proportion to (1−N) can, be obtained with these operations carried out at the same time.

The frequency of the clock pulses generated by the pulse generating circuit C 113 becomes fv×48 Hz, wherein "fv" represents a field scanning frequency.

A terminal 206 is arranged to receive a rectangular wave signal PUL-C, which is for designating a period for counting the above-stated pulses by the counter A 102. The signal PUL-C causes AND gates 117 and 119 to perform gate operations on the pulses. A terminal 207 is arranged to receive a rectangular signal PUL-D, which is for designating a period for counting the pulses by the counter B 103. The signal PUL-D likewise causes AND gates 118 and 120 to perform gate operations on the pulses. An OR gate 121 is arranged to supply the pulse output of the pulse generating circuit B 112 and that of the pulse generating circuit C 113 to the counters A 102 and B 103.

In the period during which the reproducing heads 2A and 2B trace the recording tracks on the tape 1, the counters A 102 and B 103 thus take in from the counter P 101 the initial data required for determining the thrusting positions of the heads 2A, 2B and count the pulses to obtain inclinations proportional to the inclination of the tracing locus of the reproducing heads 2A, 2B and that of the recording track. By this arrangement, a fixed pattern signal can be generated in the form of a digital data to enable each of the reproducing heads 2A, 2B to accurately trace a desired recording track while the tape 1 is allowed to travel at an arbitrary speed.

Figure 7:
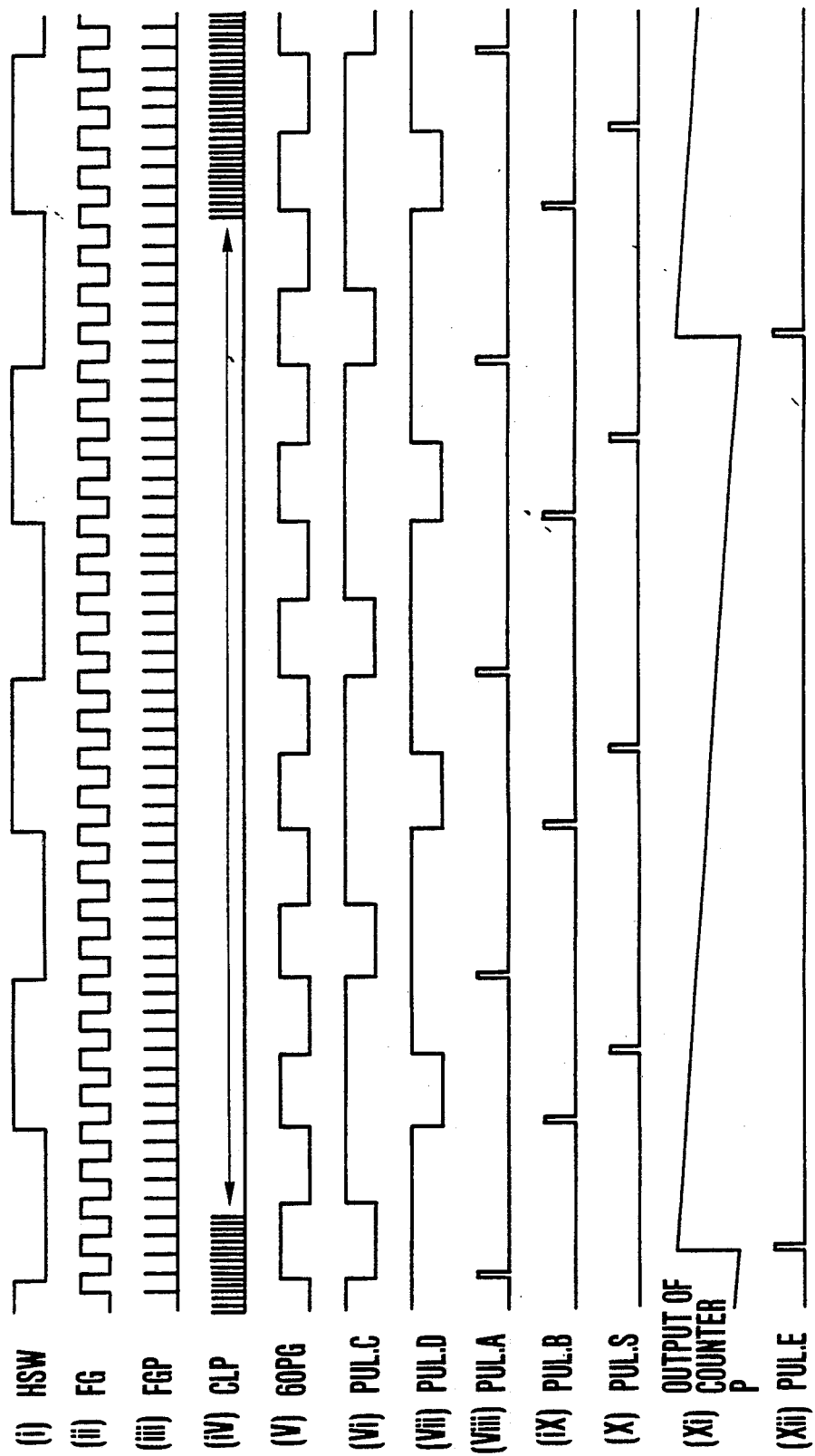
FIG. 7 is a timing chart showing the manners in which various timing signals are produced in the conversion element control circuit of FIG. 6.

The manner in which the timing signals are generated in this embodiment is described in detail, as follows, with reference to the timing chart of FIG. 7: Referring to FIG. 7, a part (i) shows the HSW signal. One field portion of a video signal is reproduced from each recording track by the reproducing head 2A when the HSW signal is at a high level and by the other reproducing head 2B when the HSW signal is at a low level. When the value fv is 60 Hz, the HSW signal is a rectangular wave signal of 30 Hz and is supplied as timing pulses of 30 Hz related to the rotation of the head and 30 PG to each of the applicable parts of the apparatus. A part (ii) shows the capstan FG signal. A part (iii) shows pulses (FGP) generated by the pulse generating circuit B 112 in relation to the capstan FG signal. Both the wave forms of the parts (ii) and (iii) are obtained in forward or positive ½ slow speed reproduction. A part (iv) shows pulses (CLP) which are generated by the pulse generating circuit C 113 by narrowing the width of the clock pulses (CL) supplied from a terminal 210. A part (v) shows timing pulses of 60 Hz (60 PG), which are phase locked with reference to the HSW signal. A part (vi) shows the rectangular wave signal (PUL-C) supplied to the terminal 206. A part (vii) shows the rectangular wave signal (PUL-D) supplied to the terminal 207. A part (viii) shows the pulses (PUL-A) supplied to a terminal 202 for the purpose of presetting the counter A 102. A part (ix) shows the pulses (PUL-B) supplied to the terminal 204 for presetting the counter B 103. A part (x) shows sampling pulses supplied to the terminal 205. A part (xi) is an analog representation of the data produced from the counter P 101. Another part (xii) shows pulses (PUL-E) produced from the terminal 203.

Since the reproducing head 2A reproduces one field portion of the video signal from each recording track during the high level period of the HSW signal (i), this period is theoretically sufficient for an effective period of the fixed pattern signal (or a period during which the above-stated phase information and the speed information are included in the signal). In actuality, however, the piezoelectric conversion element brings about a ringing phenomenon in response to a sudden change in the impressed voltage. Besides, each recording track includes not only the area in which one field portion of the video signal is recorded but also another area in which other signals, such as a digital audio signal, are recorded. Further, a tracking control signal must be obtained from the area having other signals. In this embodiment, therefore, the effective period of the fixed pattern signal, i.e. the period during which the counter A 102 can count the output of the pulse generating circuit B 112 and that of the pulse generating circuit C 113, is arranged to include not only the high level period of the HSW signal but also a ½ field scanning period immediately before that. This effective period is obtained as a period during which the pulse signal PUL-C shown in the part (vi) is at a high level. This signal PUL-C (vi) can be readily obtained from the HSW signal (i) and the 60 PG signal (v) through a logic circuit (not shown in the drawing). The PUL-D signal (vii) is also formed as shown in FIG. 7 for the same reason.

The timing at which the counter A 102 and the counter B 103 take in the initial data is determined by the pulse signal PUL-A (ix) and the pulse signal PUL-B (viii) which are supplied to the terminals PR of these counters. Any timing may be used for that purpose as long as it is not included in the effective period of the fixed pattern signal. In this specific embodiment, the above-stated timing is arranged to be immediately after the effective period of the fixed pattern signal for the purpose of avoiding any excessive level change in the fixed pattern signal immediately before the effective period thereof, so that the above-stated ringing phenomenon can be prevented. The pulse signals PUL-A (ix) and PUL-B (viii) can be formed by using the falls of the pulse signals PUL-C (vi) and PUL-D (vii). As for the pulse signals PUL-S (x) and PUL-E (xii), the details of them will be described later herein.

Figure 8:
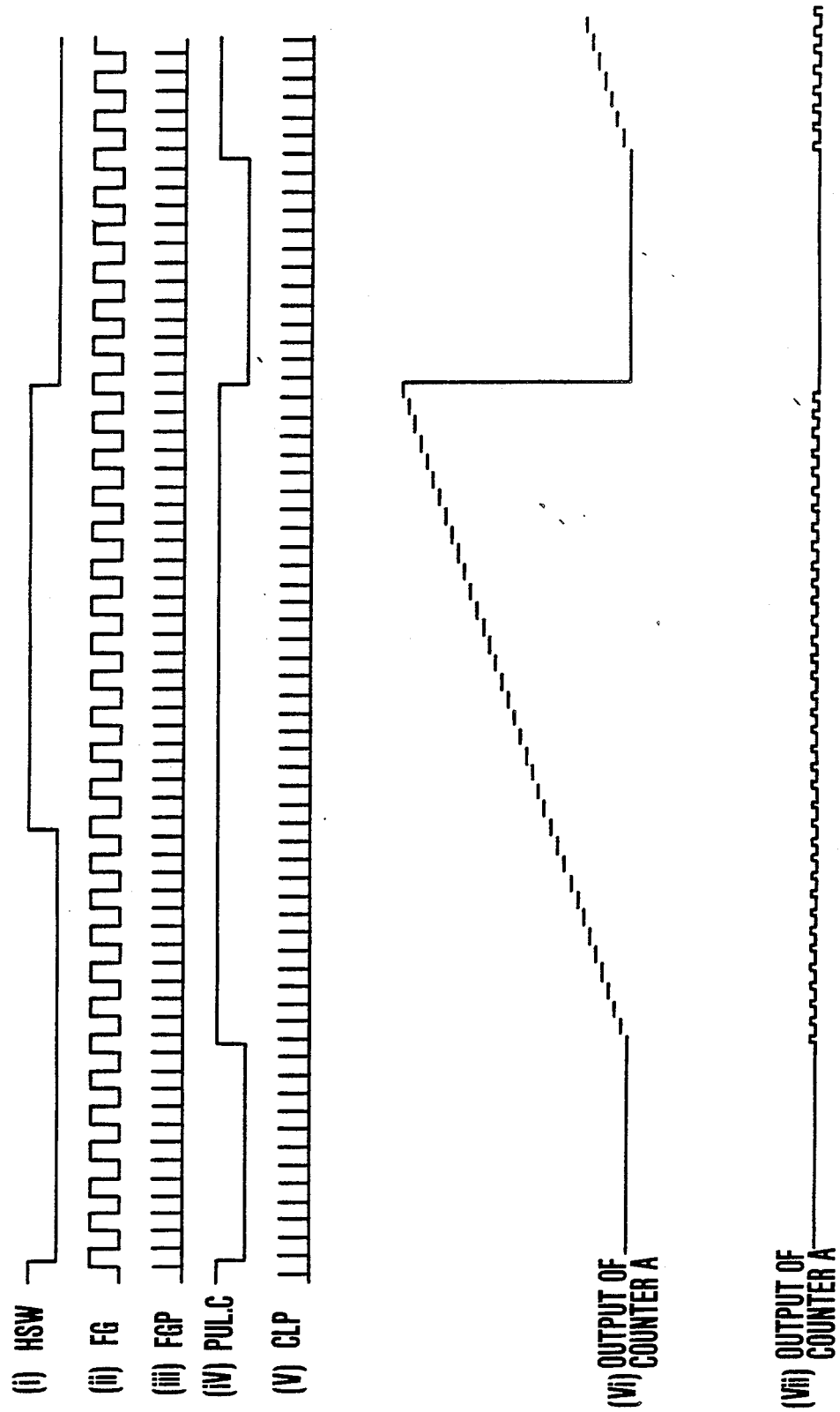
FIG. 8 is a timing chart showing fixed pattern signals produced during still picture reproducing and normal reproducing.

The fixed pattern signal obtainable by this embodiment is described in further detail with the tape travelling speed set at some specific values as follows: FIG. 8 is a timing chart which shows at parts (vi) and (vii) thereof the fixed pattern signals obtained in cases where the tape travelling speed is 0 (or in the event of still picture reproduction) and where the tape speed is the same as the recording speed (or standard reproduction). In FIG. 8, parts (ii) and (iii) respectively show the signals FG and FGP which are obtained during the standard reproduction At the parts (vi) and (vii), the data produced from the counter A 102 is shown in an analogous manner. In still picture reproduction, the signal FGP is not produced and the signal CLP is alone counted by the counters A 102 and B 103. As a result, the output of the counter A 102 becomes as shown at the part (vi) of FIG. 8. Further, since the data produced from the counter P 101 is always of a constant value, the output of the counter B 103 has the same wave form as the wave form shown at the part (vi) in FIG. 8 with the phase thereof differing 180 degrees from the latter. In case of the standard reproduction on the other hand, the signals FGP and CLP have the same frequency. The counters A 102 and B 103 in this instance down count the signal FGP and up count the signal CLP within the effective period of the fixed pattern signal. Their outputs thus become almost unvarying. In this instance, the output of the counter B 103 has a wave form which is obtained by shifting the output (vii) of the counter A 102 to an extent corresponding to a level required in driving the conversion element to an extent corresponding to 1 TP. This is because the point of time at which the counter B takes in the output value of the counter P 101 differs from the point of time at which the counter A takes it in as much as one field scanning period and during that difference period, the counter P 101 further counts the signal FGP to an extent corresponding to 1 TP.

Figures 9A, 9B:
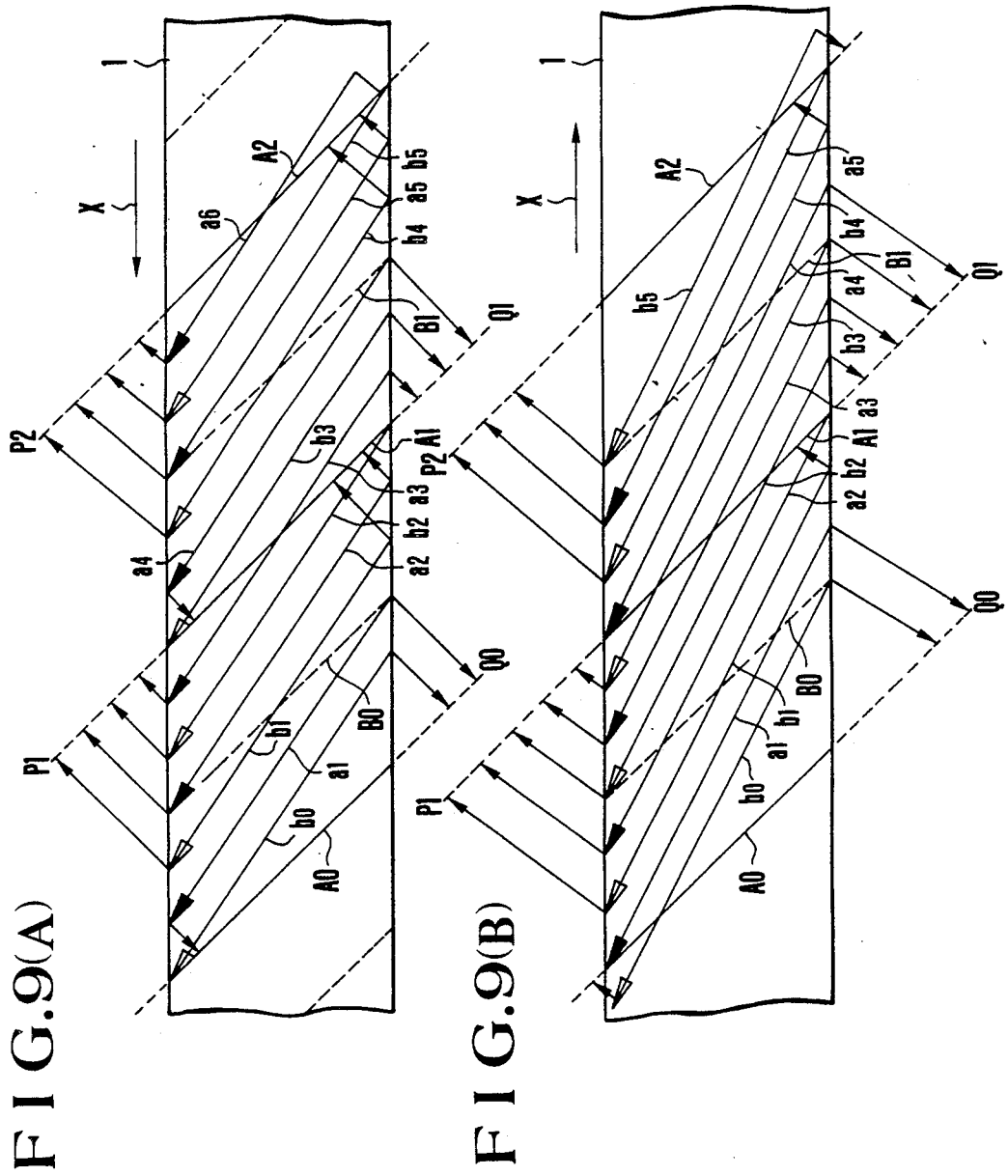
FIGS. 9(A) and 9(B) are illustrations of the relations which take place between recording tracks and the tracing loci of the reproducing heads during reproducing operations performed at a ⅓ slow tape travelling speed in the normal and reverse directions.
Figure 10:
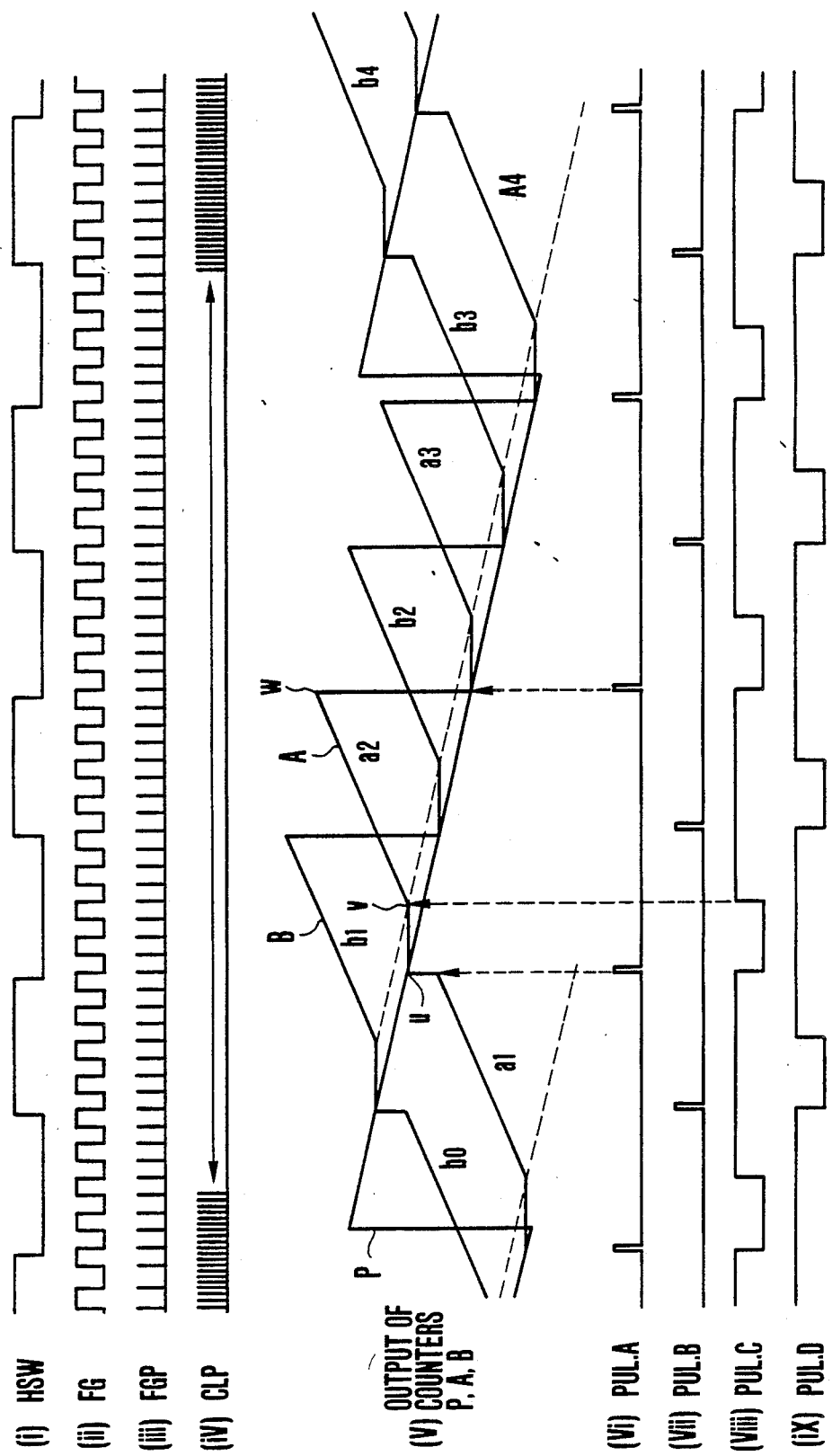
FIG. 10 is a timing chart showing a fixed pattern signal produced in the event of reproduction performed at a normal ⅓ slow tape travelling speed.
Figure 11:
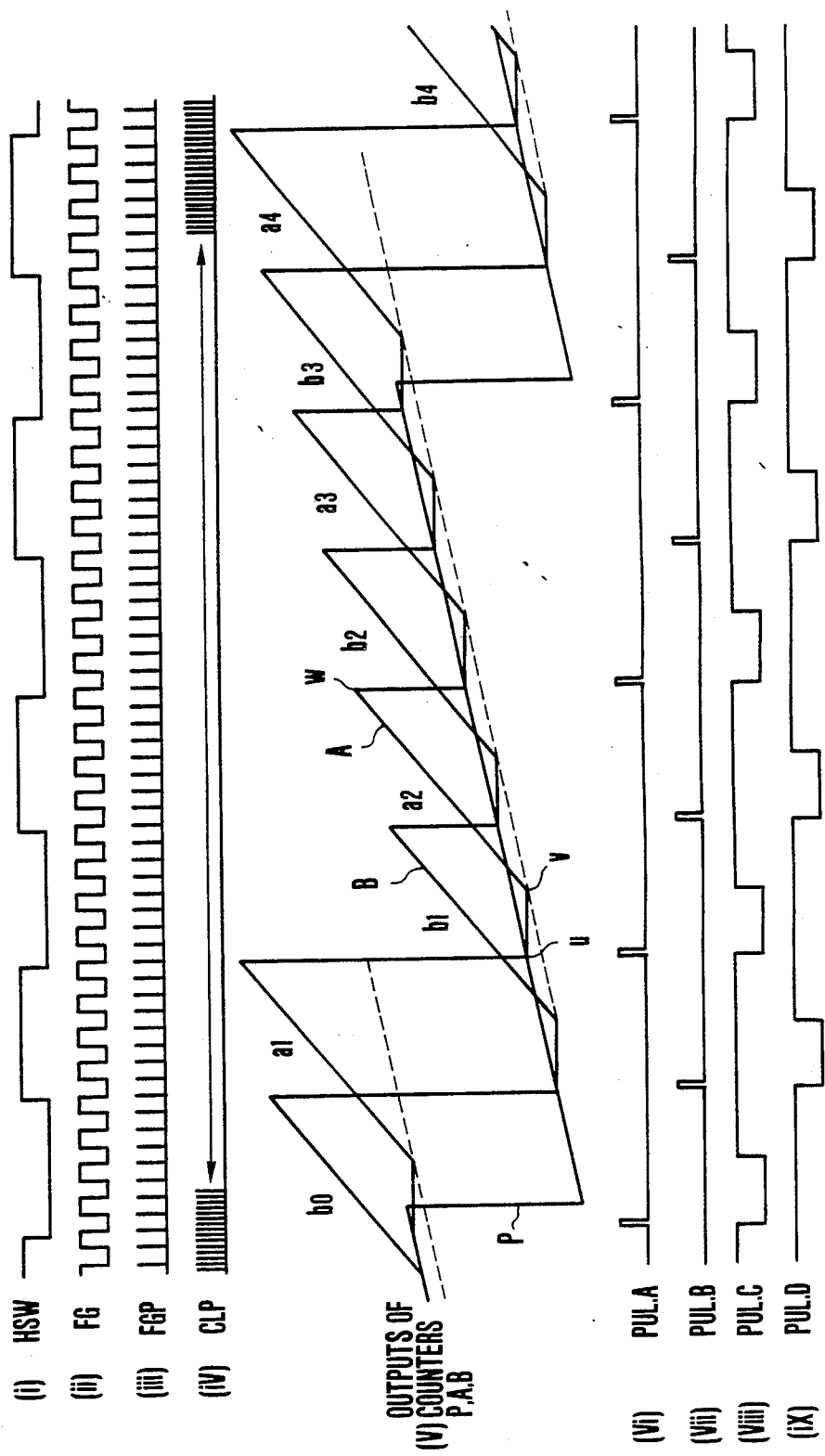
FIG. 11 is a timing chart showing a fixed pattern signal produced in the event of reproduction performed at a reverse ⅓ slow tape travelling speed.

FIGS. 9(A) and 9(B) show the relations of the tracing loci of the reproducing heads to the recording tracks on the tape obtained during forward and reverse ⅓ slow speed reproducing operations. FIG. 10 is a timing chart showing at a part (v) thereof the fixed pattern signal obtained during the forward ⅓ slow speed reproduction. FIG. 11 is a timing chart showing at a part (v) thereof the fixed pattern signal obtained during the reverse ⅓ slow speed reproduction.

Referring to FIGS. 9(A) and 9(B), reference symbols A0, A1 and A2 respectively denote the center lines of recording tracks formed by a recording head having the same azimuth angle as that of the reproducing heads 2A and 2B. Symbols B0 and B2 denote center lines of recording tracks formed by a recording head having an azimuth angle different from that of the reproducing heads 2A and 2B. Symbols a1–a6 denote the center lines of the tracing loci of the head 2A obtained with displacement by the conversion element 3A assumed to be zero. Symbols b0–b5 denote the center lines of the tracing loci of the head 2B obtained with displacement by the conversion element 3B assumed to be zero. An arrow X denotes the travelling direction of the tape.

The normal or reverse ⅓ slow speed reproduction is performed, as well known, by tracing every other recording track six times. For example, in the case of FIG. 9(A), the recording track A1 is traced six times by the tracing actions as indicated by the tracing loci b1, a2, b2, a3, b3 and a4. As a result of that, fixed patterns A and B (analogous representation of the output data of the counters A 102 and B 103) are generated in this embodiment as shown at a part (v) of FIG. 10. At the part (v), a symbol P denotes an analogous representation of the output data of the counter P.

Again referring to FIG. 9(A), in adjusting the tracing locus a2 to the track A1, for example, the output of the counter P is taken in by the counter A at a point of time "u" in FIG. 10. At a point "v", the counter A begins to count. The counter A stops counting at another point "w" and again takes in the output of the counter P at that point. It will be apparent with reference also to the illustration of FIG. 9(A) that a desired fixed pattern signal can be obtained by repeating these steps. FIG. 11 likewise shows fixed patterns obtainable by this embodiment as indicated by reference symbols A and B at a part (v) of FIG. 11. Another symbol P denotes an analogous representation of the output data of the counter P. At a point "u", the counter A likewise takes in the output data of the counter P. The counter A begins to count at a point "v" and stops counting at a point "w". The counter A again takes in the output of the counter P at the point "w". FIG. 11 in conjunction with FIG. 9(B) clearly shows that a desired fixed pattern signal is obtainable by the embodiment.

While the tracing locus of the head can be adjusted to the recording track in the manner as described above, the phase information thus obtained is nothing more than relative information as mentioned in the foregoing. Therefore, to bring the phase information closer to absolute information by adjusting the thrusting-in position of the reproducing head to a recording track to be reproduced, the embodiment is provided with a thrusting-in phase control circuit 123.

The thrusting-in phase control circuit 123 is arranged as follows In this specific embodiment, a tracking control signal is used for the adjustment of the thrusting-in phase. This tracking control signal is supplied from the tracking control circuit 53 which is described in the foregoing. This embodiment is arranged to perform the above-stated 4 f type tracking operation. Therefore, the tracking signal is available from each of the reproducing heads 2A and 2B while the reproduced signal is being obtained from them. As apparent from FIGS. 5 and 6, the tracking control signals ATF-A and ATF-B which are obtained from the reproducing heads 2A and 2B are subtracted from the fixed pattern signals to be used for the heads 2A and 2B. This is for the purpose of correcting the deviation of the tracing loci of the reproducing heads 2A and 2B which takes place from the track when the conversion elements 3A and 3B are driven simply by the fixed pattern signals Therefore, the fixed pattern signals are shifted by means of the tracking control signal ATF-A or ATF-B.

The signal ATF-A which is supplied to the terminal 201A is sampled and held by a sample-and-hold circuit (S/H) 132 which uses as a sampling pulse the timing pulse signal PUL-S arranged to indicate an intermediate timing of each scanning field. The timing of the signal PUL-S is as shown in FIG. 7. The output of the sample-and-hold circuit 132 is supplied to a voltage detection circuit which consists of comparators 133 and 134 and resistors R1, R2 and R3. The comparator 133 produces a high level output when the output of the circuit 132 is higher than a predetermined voltage E1. The comparator 134 produces a high level output when the output of the circuit 132 is lower than another predetermined voltage E2 which is lower than the voltage E1.

The output of the comparator 133 is supplied to an AND gate 135 and that of the comparator 134 to an AND gate 136. The pulses from the pulse generating circuit A 131 are gated by these AND gates. The pulse generating circuit A 131 narrows the pulse width of the above-stated pulse signal PUL-A and supplies the narrowed pulses to the AND gates 135 and 136 If the signal ATF-A is higher than the value E1 at the timing of the pulse signal PUL-S, the AND gate 135 supplies pulses to the terminal CD of the counter P 101. If the signal ATF-A is lower than the value E2 at the timing of the signal PUL-S, the AND gate 136 supplies pulses to the terminal CU of the counter P 101. This arrangement is based on the assumption that: The thrusting position of the reproducing head 2A is ahead of the track when the signal ATF-A is higher than the predetermined voltage E1; is approximately on track when the signal ATF-A is between the predetermined voltages E1 and E2; and is behind the track when the signal is lower than the voltage E2. More specifically, if the thrusting position of the head 2A is ahead of the track, the counter P 101 is caused to down count once for every 2 filed scanning periods to have the output of the counter P 101 shifted downward. Therefore, the fixed pattern signal is also shifted downward to bring the thrusting positions of the heads 2A and 2B closer to their on-track states. If the thrusting position of the head 2A is behind the track, the fixed pattern signal is shifted upward to bring the head closer to the on-track state. This is accomplished by counting one cut-in pulse for every 2 field scanning periods when the counter P 101 is counting the signal FGP. For example, if the thrusting position of the head onto the track is deviating by a distance corresponding to ½ TP at the initial stage of reproduction, the deviated thrusting position of the head is adjusted to an on-track position by allowing the counter P 101 to count 24 cut-in pulses. In this instance, the length of time required for the adjustment can be expressed as $48 \times 1/fv$ and the on-track state is obtainable within one second. Further, in accordance with the arrangement of this embodiment, the deviation of the thrusting position of the head due to slippage between the capstan and the tape of course can be corrected.

Such being the arrangement of the embodiment, the tracking operation can be satisfactorily performed with the head brought to an on-track state by shifting the fixed pattern signal even in the event of still picture reproduction. It is another advantage of the embodiment that the tape can be brought to a stop without any timing arrangement for that purpose, so that the control arrangement of the whole apparatus can be simplified.

The pattern signal generating circuit 56 thus generates via the D/A converters 106 and 107 the fixed pattern signals for driving the conversion elements 3A and 3B to enable the reproducing heads 2A and 2B to trace a desired recording track at a desired tape travelling speed.

The OR gate 151 shown in FIG. 6 is arranged to produce a pulse signal when a carry signal or a borrow signal is generated by the counter P 101. This signal is indicative of the renewal of the track to be reproduced and is supplied to the tracking control circuit 53 as a track renewal signal PUL-E. In the case of the 4 f type tracking operation, the pilot signal obtained from the track and the pilot signals obtained from the adjacent tracks on both sides of the track vary every time the track to be reproduced changes from one track to another. Therefore, the signal processing manner also varies every time the reproducing track changes from one track to another. For example, in case where the reproduced signal is processed by multi-playing the pilot signal component included in the reproduced signal by a reference signal, the frequency of the reference signal to be used for the multiplication varies. The change-over thus required is arranged to be done by means of the above-stated track renewal pulse signal PUL-E.

Again referring to FIG. 6, the rest of the conversion element control circuit 55 is arranged as follows LPF's 161 and 162 are arranged to remove the high frequency components of the fixed pattern signals for the purpose of preventing the above-stated ringing phenomenon. A subtracter 171 is arranged to subtract the signals ATF-A and ATF-B from the fixed pattern signals for the heads 2A and 2B. A DC component removal circuit 59 is arranged to detect by means of an integrator 180 the average value of a DC component included in the signal output of a subtraction circuit 58 and to remove it by means of differential amplifiers 181 and 1.2. Signals produced from the differential amplifiers 181 and 182 are impressed on the piezoelectric conversion elements 3A and 3B from terminals 211 and 212 via amplifiers 191 and 192, LPF's 193 and 194 and high voltage amplifiers 195 and 196.

Figure 12:
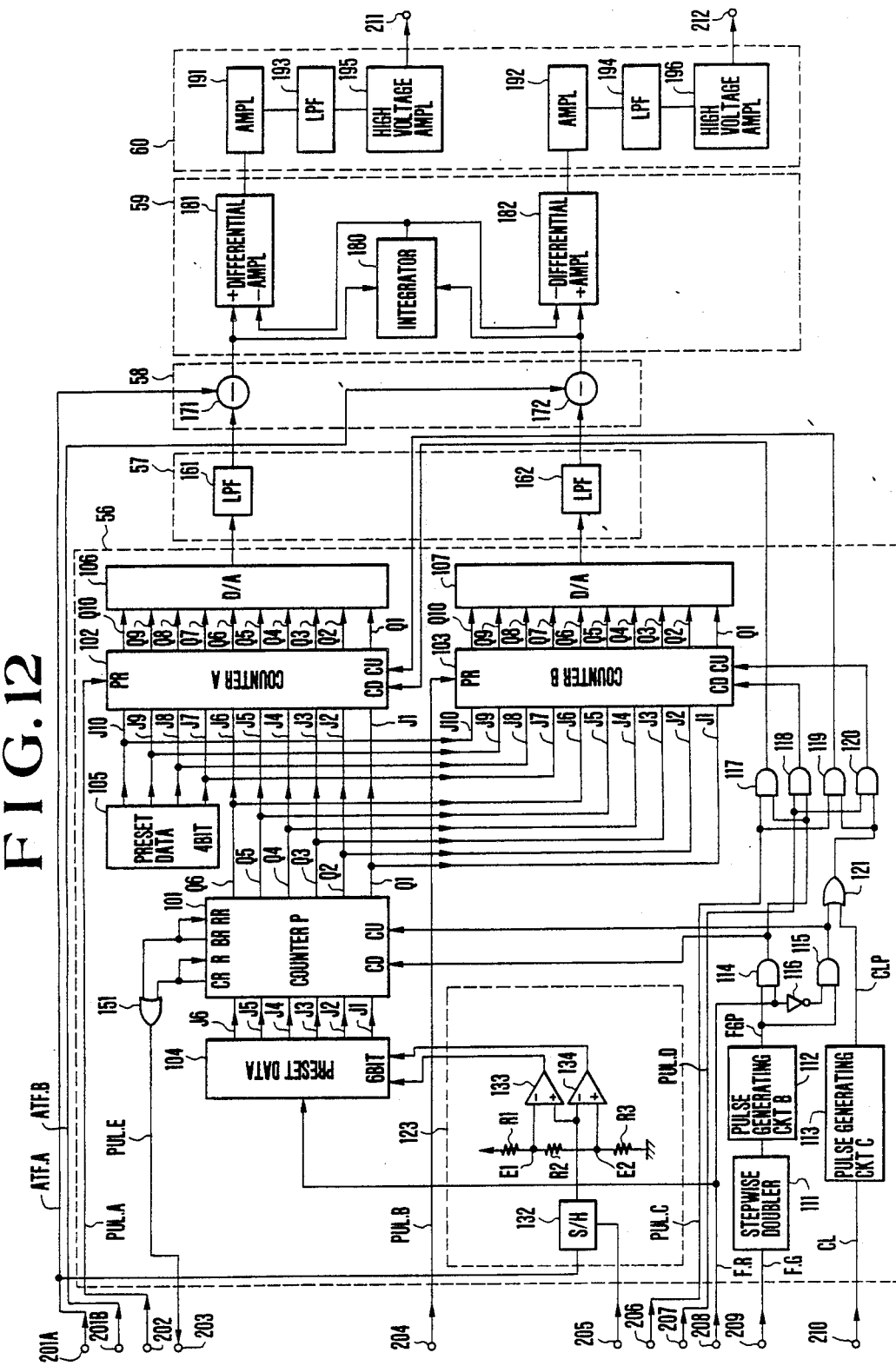
FIG. 12 is a circuit diagram showing another example of the detailed arrangement of the conversion element control circuit shown in FIG. 5.

FIG. 12 shows another example of the pattern signal generating circuit in which the arrangement of the pattern signal generating circuit shown in FIG. 6 is changed in part. Referring to FIG. 12, the outputs of the comparators 133 and 134 are respectively supplied to a preset data generator 104. The fixed pattern signal must be shifted downward when the output of the comparator 133 is at a high level. The fixed pattern signal must be shifted upward when the output of the other comparator 134 is at a high level. In case where the magnetic tape is driven in the positive direction, the fixed pattern signal shifts downward when the preset data becomes smaller. If the tape is driven in the negative direction, the preset data shifts upward according as the preset data becomes smaller. Accordingly, the preset data generator 104 is arranged to make the preset data smaller when the output of the comparator 133 is at a high level and the F/R signal is at a high level or when the output level of the comparator 134 is high and the F/R signal is at a low level. Meanwhile, the preset data becomes larger when the output level of the comparator 133 is high and the F/R signal is at a low level or when the output level of the comparator 134 is high and the F/R signal is at a high level.

This arrangement is made on the assumption that the thrusting position of the reproducing head 2A is ahead of the track when the signal ATF-A is above the predetermined voltage value E1; is approximately in an on-track state when the signal ATF-A is below the voltage E1 and above another predetermined voltage E2; and is behind the track when the signal ATF-A is below the voltage E2. In other words, when the thrusting position of the head 2A is ahead of the track, the output of the counter P 101 shifts downward to down-shift the fixed pattern signal accordingly. Therefore, the thrusting positions of the heads 2A and 2B both come closer to the track. In the event that the thrusting position of the head 2A is behind the track, the fixed pattern signal is shifted upward to bring the heads closer to their on-track states. For example, in case that the thrusting position of the head at the beginning of reproduction is deviating as much as ½ TP from the track to be reproduced and the preset data changes by 1, the position of the head can be brought to the on-track state with presetting or resetting repeated 24 times. In this instance, the length of time required before obtaining the on-track state is $48 \times 1/fv$, which is less than one second. Further, in accordance with the arrangement described, the deviation of the thrusting position of the head due to slippage between the capstan and the tape of course also can be corrected.

In the example described above, the thrusting phase (or position) control circuit 123 is arranged to supply one pulse to the counter P 101 for two field periods of the video signal for the purpose of avoiding any variation that would be caused in the reproduced picture by driving the conversion elements to a slight degree while the reproducing head are tracing the track. However, the timing for the pulse supply may be determined as desired if the elements are driven only at a rate of 1/24 TP per pulse or thereabout.

Further, in the example given above, pulses for fine adjustment of the thrusting phase are supplied in accordance with the ATF signal. However, the number of pulses to be supplied for that purpose may be determined by some other suitable method. In the event of thrusting phase deviation mainly caused by slippage between the capstan and the tape due to aging or some adjustment error of the apparatus, the thrusting position or phase can be stabilized by manually operating a volume or the like and by supplying a pulse signal of frequency corresponding to the volume thus obtained to the terminal CU of the counter P 101.

This embodiment is arranged to accurately trace the area in which one field portion of a video signal is recorded within a recording track. However, this invention is applicable also to other cases where any desired area is to be accurately traced within a recording track. For example, a recording track includes an area in which a digital audio signal is recorded to be traced by the head before the video signal recorded area. This audio signal are also can be accurately traced by using the ATF signal obtained immediately after the head is thrusted onto the audio area. In that instance, the video signal area of course also can be accurately traced.

Further, in the example shown in FIG. 12, the preset data for fine adjustment of the thrusting phase is adjusted in accordance with the ATF signal. However, the preset data is adjustable also in a different manner. For example, in the event of thrusting phase deviation mainly caused by slippage between the capstan and the tape due to aging or some adjustment error of the apparatus, the thrusting position can be stabilized by manually operating a volume or the like and by determining the preset data according to the volume thus obtained.

While the pulse for fine adjustment of the thrusting phase are supplied according to the ATF signal in the example described above, the thrusting position can be stabilized by manually operating a volume or the like and by providing the terminal CU of the counter P 101 with a pulse signal of frequency corresponding to the volume thus obtained.

What is claimed is:

1. A rotating head type reproducing apparatus arranged to reproduce a recorded signal by tracing one after another, with rotating heads, many recording tracks formed on a record bearing medium at a given track pitch, comprising:
   (a) moving means for moving the record bearing medium in a direction crossing the recording tracks;
   (b) shifting means for shifting the positions of said rotating heads in a direction crossing their rotation plane;
   (c) means for generating a pulse signal in response to the record bearing medium moving action of said moving means;
   (d) means for generating a timing signal related to the rotation of said rotating heads;
   (e) a first counter element for counting said pulse signal, the counted value of said first counter element being arranged to return to an initial data every time a predetermined number of the pulse signal is counted;
   (f) tracking error signal generating means for generating a tracking error signal by detecting a positional error of said rotating heads in relation to one of said many recording tracks based on a reproduced output signal of said rotating heads;
   (g) adjusting pulse generation means for generating adjusting pulses by using said timing signal;
   (h) gate means for gating said adjusting pulses based on said tracking error signal to adjust the counted value of said first counter element, an output of said gate means being supplied to said first counter element;
   (i) a second counter element arranged to read a data corresponding to the counted value of the first counter element at a timing related to said timing signal and to count the pulse signal; and
   (j) control means which forms a control signal for controlling the shifting means by using a control value of said second counter element.

2. An apparatus according to claim 1, further comprising data generation means for generating a data to be read by said second counter element together with the data corresponds to the counted value of said first counter element.

3. An apparatus according to claim 1, wherein said control means forms said control signal by using the data corresponding to the counted value of said second counter element and said tracking error signal.

4. An apparatus according to claim 3, wherein said control means includes a mixing circuit which mixes a signal based on the data corresponding to the counted value of said second counter element means with said tracking error signal.

5. An apparatus according to claim 4, wherein said control means further includes a circuit for removing the high frequency component of a signal produced from said mixing circuit.

6. An apparatus according to claim 1, wherein said first counter element either up counts or down counts said pulse signal according to the direction in which said record bearing medium is moved by said moving means.

7. An apparatus according to claim 6, wherein said first counter element is arranged to be reset by the carry signal thereof.

8. An apparatus according to claim 7, wherein said first counter element is arranged to be preset by the borrow signal thereof.

9. An apparatus according to claim 1, wherein said second counter element either up counts or down counts said pulse signal according to the direction in which said record bearing medium is moved by said moving means.

10. An apparatus according to claim 9, wherein said second counter element is arranged to be preset by said timing signal.

11. An apparatus according to claim 1, wherein said pulse signal generating means includes a member which detects the moving action of said moving means and a circuit which multiplies the frequency of a signal produced from said member.

12. A rotating head type reproducing apparatus arranged to reproduce a recorded signal by tracing one after another, with rotating heads, many recording tracks formed on a record bearing medium at a given track pitch, comprising:

(a) moving means for moving the record bearing medium in a direction crossing the recording tracks;

(b) shifting means for shifting the positions of said rotating heads in a direction crossing their rotation plane;

(c) pulse signal generating means for generating a pulse signal in response to the record bearing medium moving action of said moving means;

(d) timing signal generating means for generating a timing signal relating to the rotation of said rotating heads;

(e) a counter element for counting said pulse signal, the counted value of said counter element being arranged to return to an initial data every time a predetermined number of the pulse signal is counted;

(f) tracking error signal generating means for generating a tracking error signal by detecting a positional error of said rotating heads in relation to one of said many recording tracks based on a reproduced output signal of said rotating heads;

(g) adjusting pulse generating means for generating adjusting pulses by using said timing signal;

(h) gate means for gating said adjusting pulses based on said tracking error signal to adjust the counted value of said counter element, an output of said gate means being supplied to said counter element; and (i) control means for forming a control signal for controlling the shifting means by using the counted value of said counter element and said timing signal.

13. An apparatus according to claim 12 wherein said predetermined number of the pulse signal relates to the track pitch.

14. An apparatus according to claim 12, wherein said gate means is arranged to change a state thereof according to a level of said tracking error signal, between a first state in which said counter element is caused to up count said adjusting pulses, a second state in which said counter element is caused to down count said adjusting pulses, and a third state in which the gate means cuts off the supply of said adjusting pulses to said counter element.

15. An apparatus according to claim 12, wherein said gate means includes a sampling circuit which samples said tracking error signal; and said gate means gates the adjusting pulses based on an output of said sampling circuit.

16. An apparatus according to claim 15, wherein said sampling circuit operates in synchronism with the rotation of said rotating heads.

17. An apparatus according to claim 16, wherein said sampling circuit is arranged to operate at a timing immediately after said rotating heads begin to trace said recording track.

* * * * *

UNITED STATES PATENT AND TRADEMARK OFFICE
CERTIFICATE OF CORRECTION

PATENT NO. : 4,991,031
DATED : February 5, 1991
INVENTOR(S) : Nobutoshi Takayama et al It is certified that error appears in the above-identified patent and that said Letters Patent is hereby corrected as shown below:

Title page:

Takayama et al

[75]  Inventors:  Nobutoshi Takayama, Kanagawa;
Hiroo Edakubo; Susumu Kozuki,
both of Tokyo; Masahiro Takei;
Kenichi Nagasawa, both of Kanagawa,
all of Japan

Signed and Sealed this

Twenty-seventh Day of October, 1992

*Attest:*

DOUGLAS B. COMER

*Attesting Officer*    *Acting Commissioner of Patents and Trademarks*